UNITED STATES PATENT OFFICE.

RICHARD C. REMMEY, OF PHILADELPHIA, PENNSYLVANIA.

COMPOSITION FOR THE MANUFACTURE OF STONEWARE, &c.

SPECIFICATION forming part of Letters Patent No. 357,410, dated February 8, 1887.

Application filed November 27, 1885. Serial No. 184,073. (Specimens.)

*To all whom it may concern:*

Be it known that I, RICHARD C. REMMEY, of the city of Philadelphia, in the county of Philadelphia and State of Pennsylvania, have invented a new and useful Composition of Matter to be Used for the Manufacture of Stoneware Articles, especially those intended for chemists' use, of which the following is a specification.

My composition consists of the following ingredients, combined as and in the manner hereinafter set forth: Christiana, Delaware, clay, five hundred pounds; Delaware yellow brick-clay, two hundred and fifty pounds; flour of mica, forty pounds; pulverized fine burnt clay, fifty pounds. Mix the above thoroughly and add sufficient water to give the composition the consistency of dough. Then take Connecticut brown stone, thirty pounds; feldspar, (ground,) twenty pounds; loam, (powdered,) seventy-five pounds, and stir thoroughly through the first mixture.

The Christiana, Delaware, clay is not blue clay but chocolate, and furnishes body to the composition to strengthen and hold the ware strongly together, while the Delaware yellow brick-clay furnishes body, and also makes the ware harder. The flour of mica toughens and increases the elasticity of the ware. The Connecticut brown stone and the ground feldspar strengthen the ware, and help to vitrify, and further serve to render the ware more dense.

The body of the ware formed from my composition is burned to a vitrified state, and, while resisting entirely the action of acids and acid gases, it will resist in a pre-eminent degree the changes of temperature to which other and ordinary ware would succumb.

The composition is especially intended for making the various utensils used in the manufacture and manipulation of chemicals—such as worms, stills, &c.

The advantages of stoneware made from this composition consist in its being impervious to acids, its extreme hardness, and in its standing all changes of temperature without cracking or scaling.

I do not wish to limit myself to the exact proportions above set forth, as the amount of each article used may be slightly varied.

Having thus described my invention, what I claim, and desire to secure by Letters Patent, is—

The herein-described improved composition for the manufacture of stoneware, consisting of Christiana, Delaware, clay, Delaware yellow brick-clay, flour of mica, pulverized fine burnt clay, Connecticut brown stone, ground feldspar, and powdered loam, in about the proportions stated.

In testimony whereof I have hereunto set my hand and subscribed my name in the presence of the two subcribing witnesses.

RICHARD C. REMMEY.

Witnesses:
FREDERICK J. KING,
FRANK S. CHRISTIAN.